United States Patent
Pibarot et al.

(10) Patent No.: US 11,357,242 B2
(45) Date of Patent: Jun. 14, 2022

(54) SEMI-MOIST FOOD COMPOSITIONS THAT MAINTAIN SOFT TEXTURE

(71) Applicant: Société des Produits Nestlé S.A., Vevey (CH)

(72) Inventors: Patrick Pibarot, Montferrier sur Lez (FR); Pierre Reynes, Camon (FR)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 0 days.

(21) Appl. No.: 16/564,757

(22) Filed: Sep. 9, 2019

(65) Prior Publication Data

US 2020/0029594 A1    Jan. 30, 2020

Related U.S. Application Data

(63) Continuation of application No. 15/229,884, filed on Aug. 5, 2016, now abandoned.

(Continued)

(51) Int. Cl.
*A23K 50/45* (2016.01)
*A23K 50/42* (2016.01)
(Continued)

(52) U.S. Cl.
CPC ............ *A23K 20/142* (2016.05); *A23K 10/30* (2016.05); *A23K 20/105* (2016.05);
(Continued)

(58) Field of Classification Search
CPC ...... A23K 50/45; A23K 50/48; A23K 20/142; A23K 20/147; A23K 20/163; A23K 10/30;
(Continued)

(56) References Cited

U.S. PATENT DOCUMENTS 3,759,714 A * 9/1973 Burkwall ................. A23G 3/44
426/549
4,006,266 A 2/1977 Bone et al.
(Continued)

FOREIGN PATENT DOCUMENTS

CA         996401       9/1976
GB         2041717      9/1980
(Continued)

OTHER PUBLICATIONS

International Search Report for International Appl No. PCT/IB2016/054756 dated Nov. 11, 2016.
(Continued)

*Primary Examiner* — Walter A Moore
(74) *Attorney, Agent, or Firm* — K&L Gates LLP

(57) ABSTRACT

A soft semi-moist composition, for example semi-moist extruded kibbles, is formulated to substantially maintain softness through storage in a blend with dry food compositions. Softness is maintained by hindering formation of protein-starch complexes during storage. In an embodiment, the soft semi-moist food composition comprises at least 0.5% of a free amino acid, such as glutamate, and the soft semi-moist composition has a pH at which the free amino acid is charged. In some embodiments, hydrolyzed animal or vegetable substrates are included to provide one or more free amino acids that are charged at the pH of the semi-moist food composition and maintain softness of the semi-moist food composition.

13 Claims, 5 Drawing Sheets

Related U.S. Application Data

(60) Provisional application No. 62/205,237, filed on Aug. 14, 2015.

(51) Int. Cl.
  *A23K 20/142* (2016.01)
  *A23K 10/30* (2016.01)
  *A23K 40/25* (2016.01)
  *A23K 20/105* (2016.01)
  *A23L 29/00* (2016.01)
  *A23K 20/147* (2016.01)
  *A23P 30/20* (2016.01)
  *A23K 20/163* (2016.01)

(52) U.S. Cl.
  CPC .......... *A23K 20/147* (2016.05); *A23K 20/163* (2016.05); *A23K 40/25* (2016.05); *A23K 50/45* (2016.05); *A23L 29/035* (2016.08); *A23P 30/20* (2016.08); *A23K 50/42* (2016.05)

(58) Field of Classification Search
  CPC ..... A23K 20/105; A23K 40/25; A23L 29/035; A23P 30/20
  See application file for complete search history.

(56) References Cited

U.S. PATENT DOCUMENTS

| | | | |
|---|---|---|---|
| 4,011,345 A * | 3/1977 | Bartsch | A23K 40/20 426/72 |
| 4,273,788 A * | 6/1981 | Bone | A23K 50/42 426/104 |
| 4,892,748 A | 1/1990 | Anderson et al. | |
| 5,939,124 A | 8/1999 | Wenger | |
| 7,211,280 B1 | 5/2007 | Young et al. | |
| 2002/0012689 A1 | 1/2002 | Stillman | |
| 2006/0228448 A1 * | 10/2006 | Boileau | A23K 50/40 426/61 |
| 2007/0110880 A1 * | 5/2007 | Thomas | A23K 20/158 426/623 |
| 2009/0324780 A1 | 12/2009 | Slusarczyk et al. | |
| 2010/0034925 A1 | 2/2010 | Pibarot et al. | |
| 2010/0310750 A1 | 12/2010 | She et al. | |
| 2013/0333630 A1 * | 12/2013 | Wang | A23K 10/26 119/710 |

FOREIGN PATENT DOCUMENTS

| | | |
|---|---|---|
| JP | 2095040059 A | 2/2005 |
| WO | 2014092715 A | 6/2014 |

OTHER PUBLICATIONS

International Written Opinion for International Appl No. PCT/IB2016/054756 dated Nov. 11, 2016.

Notification of Transmittal of the International Search Report and Written Opinion of International Appl No. PCT/IB2016/054756 dated Nov. 11, 2016.

Dozier et al. J. Appl. Pult. Res. 12:526-530, 2003 (Year: 2003).

Jamilah et al. J Food Agriculture and Environment, vol. 7)2): 169-174, 2009 (Year: 2009).

* cited by examiner

SEMI-MOIST FOOD COMPOSITIONS THAT MAINTAIN SOFT TEXTURE

CROSS REFERENCE TO RELATED APPLICATIONS

This application is a continuation of U.S. application Ser. No. 15/229,884 filed Aug. 5, 2016, which claims priority to U.S. Provisional Application No. 62/205,237 filed Aug. 14, 2015, the disclosure of which is incorporated herein by this reference.

BACKGROUND

The present disclosure relates generally to semi-moist food compositions. More specifically, the present disclosure relates to semi-moist extruded starch-based food compositions that maintain soft texture by hindering formation of protein-starch complexes during storage.

Commercial food compositions may be classified into three main types based upon moisture and texture. First, "dry" food compositions typically contain less than 10% moisture and have a water activity less than 0.64. Usually they are hard, inelastic, and/or crumbly. Also, they are dry to the touch and stable under ambient conditions without the use of preservatives.

Second, "semi-moist" food compositions typically contain 11% to 20% moisture and have a water activity of 0.64 to 0.75. Such compositions are usually softer than dry food compositions unless specially formulated otherwise and often have an elastic texture.

Third, "wet" food compositions contain greater amounts of moisture relative to dry and semi-moist types. They tend to degrade and spoil within hours if exposed to ambient conditions, e.g., a container of wet food composition open to the atmosphere at room temperature. In some situations, preservatives are added to enhance stability.

The above ranges are generally applicable to most food compositions, particularly pet food compositions. However, the ranges can vary and overlap depending upon the particular food composition. Skilled artisans are able to identify the type of food based upon the composition and the conditions.

Semi-moist food compositions have been combined with dry food compositions to provide mixed compositions that are organoleptically pleasing due to the variety of textures. Such mixed compositions have much of the convenience and cost-effectiveness of dry food, while the semi-moist component provides increased palatability. Moreover, such mixed compositions can ensure complete and balanced nutrition for a companion animal according to standards established by the Association of American Feed Control Officials (AAFCO).

However, the semi-moist pieces in current mixed-moisture products present an initial soft texture which becomes hard rapidly after manufacturing when mixed with dry pieces. Often the semi-moist pieces lose a substantial amount of the initial softness after less than three months of storage with dry pieces, and sometimes after one month of such storage. The loss of the soft texture is important for the palatability of the mixed-moisture product. Consequently, the problem of hardening limits the product shelf-life and/or the consumer satisfaction.

SUMMARY

To the best knowledge of the present inventors, no one prior to this application has identified the importance of the starch-protein interface in cereal/protein extruded product texture building and in water physical-chemistry of these products when submitted to water exchanges. The inventors discovered that water exchanges between dry kibbles and soft semi-moist kibbles do not completely explain hardening of the semi-moist kibbles during storage. Without being bound by theory, the present inventors found that hardening of the soft semi-moist kibbles appears to be due to interaction between starch and protein present in the soft kibbles. Modifying the interaction between starch and protein (mainly gluten) in the semi-moist kibbles can reduce or suppress the hardening process therein.

The structure of a soft semi-moist kibble is composed of a continuous starch phase and a dispersed protein phase. Both phases should remain in the rubbery state because of inclusion of a plasticizer all along the storage period to guarantee the softness stability. The present inventors identified that the dispersed protein phase has a tendency to mix in the continuous starch phase to build a macro-molecular network which is responsible for the hardening of the semi-moist kibbles.

Without being bound by theory, the present inventors believe that the addition of adequate proportions of charged molecules which complex to the amylose or amylopectin polymeric chains in an acidic environment which is below the iso-electric pH of the main proteins will result in an electron-based barrier between starch and protein (mainly gluten, depending on the formulation of the semi-moist food composition). The presence of the protein and complexed ionic starch creates repulsions between the continuous starch phase and the protein dispersed phase that prevent interaction between the two phases and therefore prevent soft kibble hardening.

The inventors discovered that standard semi-moist food pieces maintain only an average of 35% of their initial softness after three months of storage with dry pellets, but addition of 22 wt % dried digest allowed the semi-moist pieces to keep 80% of their softness after three months storage and 73% after six months storage with dry pellets. Furthermore, addition of 0.7 wt % sodium glutamate resulted in soft texture stability improvement, with almost 60% of the initial softness remaining after three months of storage in a blend with dry pellets. After six months storage in a blend, semi-moist food pieces with 0.7 wt % sodium glutamate still remained at 51-58% of their initial soft texture. Moreover, the inventors identified another option, namely injection of liquid animal digest at a level of 4-8 wt %; injection of 4% liquid animal digest obtained semi-moist chunks with 68% of their initial softness after three months storage in a blend.

Accordingly, in a general embodiment, a method of producing a soft semi-moist food composition is provided. The method comprises: forming a mixture having a pH from about 4.0 to about 8.0 and comprising water, a starch source, a humectant, and a free form amino acid selected from the group consisting of arginine, histidine, lysine, aspartic acid, glutamic acid, and combinations thereof; and extruding the mixture to form an expanded extrudate. Preferably at least a portion of the mixture is formed in the extruder. For example, a dry base (e.g., a powder) can be directed into the extruder, and the humectant and the water can be added to the dry base in the extruder to complete formation of the mixture.

In an embodiment, the free form amino acid comprises glutamic acid.

In an embodiment, the free form amino acid is present in the mixture in an amount of at least about 0.5 wt %.

In an embodiment, the method comprises adding at least a portion of the free form amino acid to the mixture in a form separate from any other material.

In an embodiment, the method comprises adding at least a portion of the free form amino acid to the mixture by adding a digest to the mixture. The free form amino acid in the digest can be at least 10 wt % of the digest.

In an embodiment, the pH is from about 5.0 to about 6.0.

In an embodiment, the method comprises adding an edible acid to the mixture to obtain the pH of about 4.0 to about 8.0.

In an embodiment, the humectant comprises a polyol selected from the group consisting of glycerol, propylene glycol, and a combination thereof.

In an embodiment, the method comprises adding the starch source to the mixture by adding starch and gluten to the mixture separately.

In another embodiment, a method of producing a blended food composition is provided. The method comprises: forming a mixture having a pH from about 4.0 to about 8.0 and comprising water, a starch source, a humectant, and a free form amino acid selected from the group consisting of arginine, histidine, lysine, aspartic acid, glutamic acid, and combinations thereof; extruding the mixture to form a soft semi-moist food composition; and mixing the soft semi-moist food composition with a dry food composition to form the blended food composition. Preferably at least a portion of the mixture is formed in the extruder. For example, a dry base (e.g., a powder) can be directed into the extruder, and the humectant and the water can be added to the dry base in the extruder to complete formation of the mixture.

In an embodiment, the blended food composition comprises the dry food composition and the soft semi-moist food composition in a ratio from about 75:25 to about 90:10.

In another embodiment, a soft semi-moist extruded food composition is provided. The soft semi-moist extruded food composition comprises: a starch source, a humectant, and a free form amino acid selected from the group consisting of arginine, histidine, lysine, aspartic acid, glutamic acid, and combinations thereof, the soft semi-moist extruded food composition having a pH at which the free form amino acid is charged.

In an embodiment, the pH is from about 4.0 to about 8.0.

In an embodiment, the soft semi-moist extruded food composition comprises a digest that provides the free form amino acid.

In an embodiment, the free form amino acid comprises glutamic acid. Free form lysine can be substantially absent from the soft semi-moist extruded food composition.

In an embodiment, the free form amino acid is present in the soft semi-moist extruded food composition in an amount of at least 0.5 wt %.

In another embodiment, a blended food composition is provided. The method comprises: a dry food composition; and a soft semi-moist extruded food composition comprising a starch source, a humectant, and a free form amino acid selected from the group consisting of arginine, histidine, lysine, aspartic acid, glutamic acid, and combinations thereof, the soft semi-moist extruded food composition having a pH at which the free form amino acid is charged. The charge can be negative or positive depending on the pH.

In another embodiment, a method of providing nutrition to a companion animal is provided. The method comprising administering to the companion animal a blended food composition comprising a dry food composition and a soft semi-moist extruded food composition comprising a starch source, a humectant, and a free form amino acid and having a pH from about 4.0 to about 8.0.

An advantage of the present disclosure is to provide improved pet foods comprising dry kibbles mixed with semi-moist kibbles.

Another advantage of the present disclosure is to provide improved food formulated for human consumption comprising dry food compositions mixed with semi-moist food compositions.

Yet another advantage of the present disclosure is to provide a pet food containing semi-moist kibbles that will maintain a substantial portion of the initial softness (e.g. at least 50% for 3-6 months) through storage in blends with dry kibbles where the dry kibbles can form up to 90% of the blend.

Still another advantage of the present disclosure is to maintain a substantial portion of the initial softness of semi-moist food compositions in blends with dry food compositions without relying on reduction or control of the water exchange between the semi-moist and dry food compositions; for example the semi-moist food compositions can remain soft if the water exchange is the typical range for the blend.

Another advantage of the present disclosure is to maintain a substantial portion of the initial softness of semi-moist food compositions in blends with dry food compositions without relying on controlling the initial water activity gap between the dry and soft food compositions.

Yet another advantage of the present disclosure is to maintain a substantial portion of the initial softness of semi-moist food compositions in blends with dry food compositions using a solution that can be applied at industrial scale.

Still another advantage of the present disclosure is to maintain a substantial portion of the initial softness of semi-moist food compositions in blends with dry food compositions without manufacturing constraints that are unrealistic for production efficiency and cost.

Another advantage of the present disclosure is to provide significant improvement of texture properties and texture stability of semi-moist food compositions in blends with dry food compositions without significant cost increases.

Yet another advantage of the present disclosure is to maintain a substantial portion of the initial softness of semi-moist food compositions in blends with dry food compositions using a compound that is nutritionally desirable, such as one or more amino acids.

Still another advantage of the present disclosure is to maintain a substantial portion of the initial softness of semi-moist food compositions in blends with dry food compositions by charging free amino acids.

Additional features and advantages are described herein and will be apparent from the following Detailed Description and the Figures.

DETAILED DESCRIPTION

Figure 1:
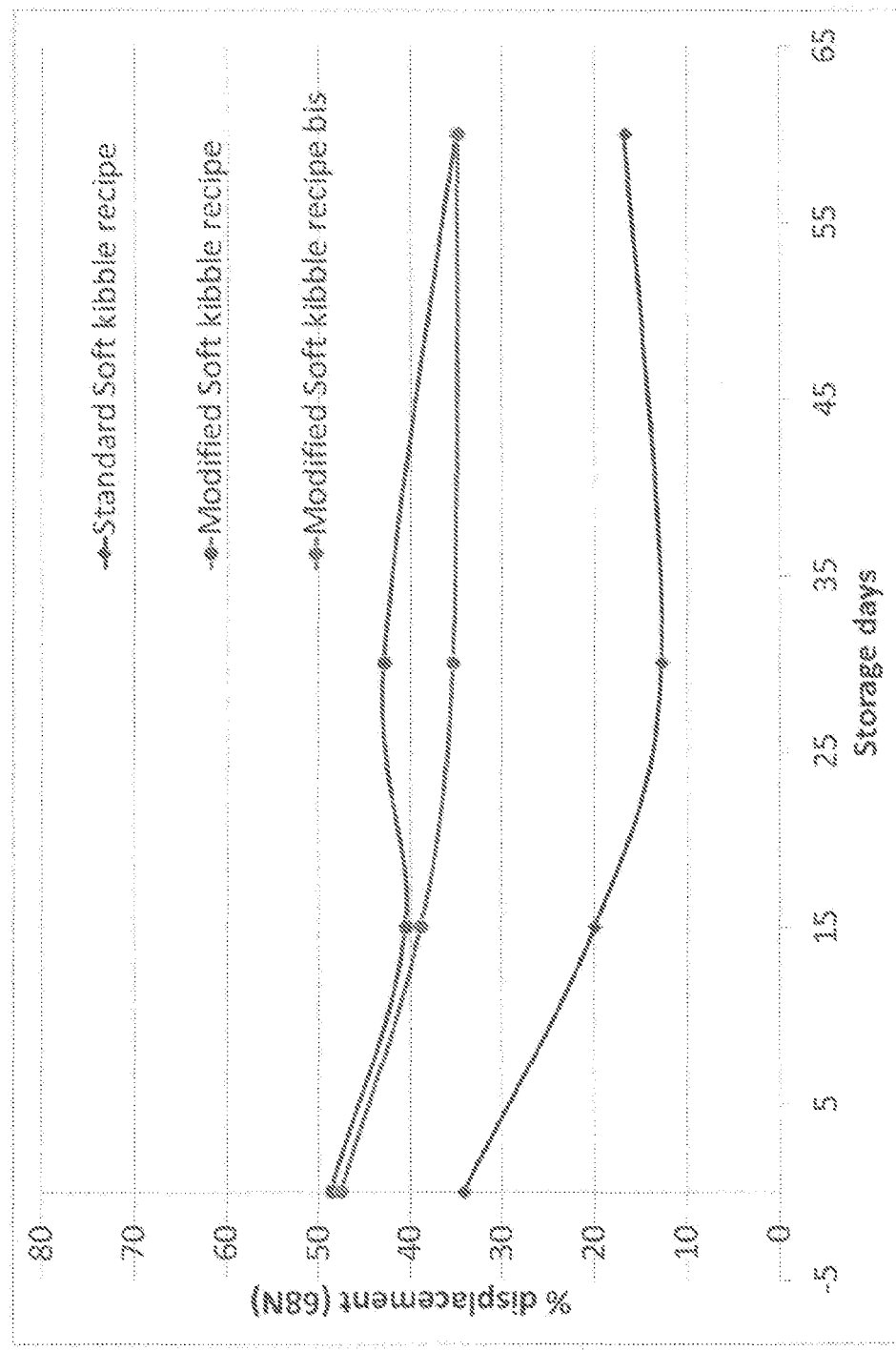
FIG. 1 is a graph showing product softness as a function of storage time in a blend with dry pellets for various soft semi-moist kibbles tested in the first experimental example in the present disclosure.

As used in this disclosure and the appended claims, the singular forms "a," "an" and "the" include plural referents unless the context clearly dictates otherwise. Thus, for example, reference to "a composition" or "the composition" includes two or more compositions. The term "and/or" used in the context of "X and/or Y" should be interpreted as "X," or "Y," or "X and Y." Where used herein, the term "example," particularly when followed by a listing of terms, is merely exemplary and illustrative, and should not be deemed to be exclusive or comprehensive.

As used herein, "about" is understood to refer to numbers in a range of numerals, for example the range of −10% to +10% of the referenced number, preferably within −5% to +5% of the referenced number, more preferably within −1% to +1% of the referenced number, most preferably within −0.1% to +0.1% of the referenced number. Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

All percentages expressed herein are by weight of the total weight of the soft semi-moist food composition unless expressed otherwise. When reference is made to the pH, values correspond to pH measured at 25° C. with standard equipment.

The terms "food," "food product" and "food composition" mean a product or composition that is intended for ingestion by an animal, including a human, and provides at least one nutrient to the animal. The term "pet food" means any food composition intended to be consumed by a pet. The term "pet" means any animal which could benefit from or enjoy the compositions provided by the present disclosure. For example, the pet can be an avian, bovine, canine, equine, feline, hircine, lupine, murine, ovine, or porcine animal, but the pet can be any suitable animal. The term "companion animal" means a dog or a cat.

A "blended" composition merely has at least two components having at least one different characteristic relative to each other, preferably at least moisture content and water activity in the context of the present disclosure. In this regard, description of a composition as "blended" does not imply that the blended composition has been subjected to processing sometimes referenced as "blending," namely mixing components so that they are indistinguishable from each other, and preferably such processing is avoided when mixing the dry component with the semi-moist component to form the blended composition disclosed herein.

The characterization of food compositions herein is consistent with the disclosure of the background above. Specifically, a "dry" food composition has less than 10% moisture and/or a water activity less than 0.64, preferably both. A "semi-moist" food composition has 11% to 20% moisture and/or a water activity of 0.64 to 0.75, preferably both. A "wet" food composition has more than 20% moisture and/or a water activity higher than 0.75, preferably both.

"Kibbles" is used synonymously with "chunks" herein and both terms mean pieces of dry or semi-moist pet food which can have a pellet shape or any other shape and preferably are made by slicing the soft semi-moist food composition disclosed herein into separate pieces. Non-limiting examples of kibbles include particulates; pellets; pieces of pet food, dehydrated meat, meat analog, vegetables, and combinations thereof; and pet snacks, such as meat or vegetable jerky, rawhide, and biscuits. A "meat analog" is a meat emulsion product that resembles pieces of natural meat in appearance, texture, and physical structure.

The compositions disclosed herein may lack any element that is not specifically disclosed herein. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified. Any embodiment disclosed herein can be combined with any other embodiment disclosed herein unless explicitly and directly stated otherwise.

In an aspect of the present disclosure, a soft semi-moist food composition is formulated to maintain softness through storage in blends with dry food compositions. Softness is maintained by hindering formation of protein-starch complexes during storage. In an embodiment, the soft semi-moist food composition comprises at least 0.5% of a free amino acid (for example about 0.5%), such as glutamate. In other embodiments, hydrolyzed animal or vegetable substrates which contain one or more free amino acids maintain softness of the semi-moist food composition. As used herein, an amino acid that is "free" or in "free form" is a monomer amino acid not covalently bound to another amino acid in a peptide or protein. An amino acid being "free form" does not exclude ionic interactions thereof.

In a preferred embodiment, the blended composition is a pet food, the soft semi-most food composition comprises soft semi-moist kibbles, and the dry food composition comprises dry kibbles. Nevertheless, some embodiments of the blended composition disclosed herein are formulated for human consumption. The blended composition can be any food product for which a soft and elastic texture stability is desired and in which water exchanges exist between the soft texture component and another component of the food product. As non-limiting examples, the blended composition can be bread, pizza, a snack, or breakfast cereal.

The soft semi-moist food composition preferably has a pH of about 4.0 to about 8.0, more preferably about 5.0 to about 6.0, most preferably about 5.0 to about 5.5. The soft semi-moist food composition can include an edible acid in an amount sufficient to establish such a pH, such as one or more of citric, ascorbic, phosphoric and malic acids, as non-limiting examples.

The soft semi-moist food composition comprises a starch source, preferably in an amount of at least 20% of the semi-moist food composition, more preferably in an amount of at least 35% of the semi-moist food composition. In some embodiments, the starch source is 50% of the semi-moist food composition or more. Non-limiting examples of suitable starch sources include grains and legumes such as corn, rice, wheat, barley, oats, soy, sorghum, millet, triticale, rye and mixtures thereof. In a preferred embodiment, the starch is not added as the corresponding grain, but instead the starch and the gluten are added separately to the mixture used to make the soft semi-moist food composition. For example, corn starch and corn gluten can be added separately, instead of as corn grain, to the mixture used to make the soft semi-moist food composition.

The soft semi-moist food composition contains one or more humectants which can be any compound that has humectant properties and is compatible with food compositions. In various embodiments, the humectant plasticizers are polyols. In preferred embodiments, the humectant is one or more of glycerol (glycerin), sorbitol, propylene glycol (e.g., monopropylene glycol), butylene glycol, polydextrose, or combinations thereof. The humectant is preferably glycerol and/or propylene glycol. In various embodiments, the humectant is from about 5% to about 20% of the soft semi-moist food composition, preferably from about 10% to about 15%. In an embodiment, the glycerol and any monopropylene glycol are present in a total amount of about 14% of the soft semi-moist food composition, for example about 9% glycerol and about 5% monopropylene glycol; however, any monopropylene glycol is preferably not greater than 5% of the soft semi-moist food composition. In some embodiments, the ratio of glycerin to monopropylene glycol is about 65:35.

To maintain the softness of the semi-moist food composition, alone or in the presence of a dry food composition, the semi-moist food composition can comprise one or more charged alkaline amino acids, in free form and selected from the group consisting of arginine, histidine, lysine and combinations thereof, and/or one or more charged acidic amino acids, in free form and selected from the group consisting of aspartic acid, glutamic acid and combinations thereof. Preferably the soft semi-moist food composition comprises at least about 0.5 wt % of the free form charged amino acid, preferably at least about 0.7 wt % of the free amino acid. For example, in some embodiments the soft semi-moist food composition can comprise from about 0.5 wt % to about 20 wt % of the free form charged amino acid or from about 0.5 wt % to about 10 wt % of the free form charged amino acid.

Amino acids have a formula of $H_2N$—CRH—COOH; the $pK_a$ of the R group of arginine is 13.2, the $pK_a$ of the R group of histidine is 5.97, the $pK_a$ of the R group of lysine is 9.47, the $pK_a$ of the R group of aspartic acid is 3.65, and the $pK_a$ of the R group of glutamic acid is 4.25. The isoelectric point of arginine is 10.76, the isoelectric point of histidine is 7.64, the isoelectric point of lysine is 9.47, the isoelectric point of aspartic acid is 2.98, and the isoelectric point of glutamic acid is 3.08. The pH of the soft semi-moist food composition is about 4.0 to about 8.0, more preferably about 5.0 to about 6.0, most preferably about 5.0 to about 5.5, so the majority of these free amino acids can be charged negatively or positively depending on the specific amino acid. Gluten has an isolectric point around 7.5 and thus is mainly charged with positive $NH_4^+$ amines at the pH of the soft semi-moist food composition.

In some embodiments, both a charged alkaline amino acid and a charged acidic amino acid are present in free form in the soft semi-moist food composition. In other embodiments, a charged alkaline amino acid is present in free form in the soft semi-moist food composition, and free charged acidic amino acids are substantially absent. In other embodiments, a charged acidic amino acid is present in free form in the soft semi-moist food composition, and free charged alkaline amino acids are substantially absent. For example, in some embodiments glutamate is used, and lysine is substantially absent. In this regard, oppositely charged amino acids can interact with each other instead of the intended targets (i.e. starch and/or protein) in the soft semi-moist food composition, which can (but does not necessarily) hinder the beneficial effect on softness stability.

These free form amino acids can be added to the mixture used to make the soft semi-moist food composition as amino acids separate from any other material. Additionally or alternatively, these free form amino acids can be added to the mixture as part of a composition having a significant amount of free form amino-acids, for example animal or vegetable protein digests. The digest preferably contains at least 10% free form amino acids, more preferably at least 15% free form amino acids, most preferably at least 20% free form amino acids.

If dried digest is used, the digest is preferably present in the soft semi-moist food composition in an amount of at least about 7.5 wt %, preferably at least 15 wt %, more preferably at least 20 wt %. If liquid digest is used, the digest is preferably present in the soft semi-moist food composition in an amount of at least about 4 wt %, preferably 4 wt % to 8 wt %. However, regardless of the form of digest used, less of the digest may be required if the digest is high in free amino acids, and more of the digest may be required if the digest is low in free amino acids, further depending on the amino acid profile of the digest.

As used herein, a "digest" is any material produced by chemical and/or enzymatic hydrolysis of clean and undecomposed animal tissue or vegetable material that contains protein. Generally, the animal tissue does not include hair, horns, teeth, hooves or feathers, except in trace amounts that are unavoidable in normal manufacturing practices. One process for producing liquid animal digests is based on autolysis, where endogenous enzymes are released from the animal tissue and then contribute to the hydrolysis of the animal tissue itself. Another hydrolysis process uses addition of enzyme-rich components to the starting material. Proteolytic enzymes from animal organs, such as pancreatin and pepsin, and from plants, such as bromelain of pineapple stems and papain of unripe papaya, can be used for this purpose, as well as technical enzymes such as proteases and lipases.

Molecules other than charged free form amino acids may have a softness maintaining effect; for example, sucrose esters may function similarly to charged free form amino acids if included in the soft semi-moist food composition. Nevertheless, sucrose esters or other neutral surfactants may not be as efficient as charged amino acids due to the absence of electrostatic interactions.

The soft semi-moist food composition can include other components in addition to the starch source, the one or more humectants, and the free form amino acids. For example, the soft semi-moist food composition can comprise one or more of a vitamin, a mineral, a preservative, a colorant or a palatant.

Non-limiting examples of suitable vitamins include vitamin A, any of the B vitamins, vitamin C, vitamin D, vitamin E, and vitamin K, including various salts, esters, or other derivatives of the foregoing. Non-limiting examples of suitable minerals include calcium, phosphorous, potassium, sodium, iron, chloride, boron, copper, zinc, magnesium, manganese, iodine, selenium, and the like.

Non-limiting examples of suitable preservatives include potassium sorbate, sorbic acid, sodium methyl para-hydroxybenzoate, calcium propionate, propionic acid, and combinations thereof. Non-limiting examples of suitable colorants include FD&C colors, such as blue no. 1, blue no. 2, green no. 3, red no. 3, red no. 40, yellow no. 5, yellow no. 6, and the like; natural colors, such as roasted malt flour, caramel coloring, annatto, chlorophyllin, cochineal, betanin, turmeric, saffron, paprika, lycopene, elderberry juice, pandan, butterfly pea and the like; titanium dioxide; and any suitable food colorant known to the skilled artisan. Non-limiting examples of suitable palatants include yeast, tallow, rendered animal meals (e.g., poultry, beef, lamb, and pork), flavor extracts or blends (e.g., grilled beef), animal digests, and the like.

In some embodiments, the soft semi-moist food composition can include meat, such as emulsified meat. Examples of suitable meat include poultry, beef, pork, lamb and fish, especially those types of meats suitable for pets. Some or all of the meat can be provided as one or more meat meals, namely meat that has been dried and ground to form substantially uniform-sized particles and as defined by the Association of American Feed Control Officials (AAFCO). In some embodiments, the amount of meat is less than the amount of starch source.

In an aspect of the present disclosure, a method for producing a soft semi-moist food composition is provided. The dry ingredients, such as the starch source, the free form amino acid source, dry vitamins and minerals, and the like, can be delivered from a bin or another suitable device into a suitable mixing device. Then the dry mixture can be transferred into a preconditioner in which water and/or stream is added to the dry mixture to produce a semi-moist wet mix. The initial moisture of the dry ingredients is typically not critical because the moisture level of the mixture can be adjusted, if necessary, by controlling the steam and/or water in the preconditioner. For example, the addition of the water and/or steam can be controlled by valves in the preconditioner.

The concentrations of the ingredients in the dry mixture can be substantially the same as the concentrations in the final soft semi-moist composition (other than water content), although typically the concentrations will be slightly less in the final soft semi-moist composition due to moisture addition in the preconditioner, a portion of which remains in the final soft semi-moist composition. For example, in some embodiments the mixture can contain about 0.7% of the free form amino acid to achieve an amount of about 0.5% of the free form amino acid in the final soft semi-moist food composition.

The humectant can be added before the preconditioner (e.g. added into the mixing device) and/or can be added in the preconditioner. The edible acid used to achieve the desired pH can also be added at any time during processing, such as before the preconditioner (e.g. in the mixing device).

A moisture sensor inside of the preconditioner can determine the moisture content of the wet mix formed in the preconditioner. In an embodiment, the wet mix formed in the preconditioner has a moisture content of about 10% to about 30%. The wet mix is preferably retained within the preconditioner for about 5 seconds to about 120 seconds, which is typically sufficient to moisten and begin cooking the mixture.

In an embodiment, the wet mix achieves a temperature of about 85° C. to about 105° C. upon exit from preconditioner. The wet mix then moves into an extruder in which the wet mix is cooked. The wet mix is preferably retained in the extruder for about 5 seconds to about 120 seconds, and the temperature inside the extruder is preferably 85° C. to 130° C. The extrudate can be cut into pieces, such as kibbles, by passing the extrudate through a die cap and/or by cutting the extrudate with a spinning knife. The starch component of the extrudate tends to expand during exit from the extruder. The extrudate experiences a drop in moisture on exiting the extruder, due to flashing off from the pressure drop to atmospheric pressure and evaporative cooling. The moisture content of the expanded extrudate is preferably about 10% to about 20%.

Optionally the moisture content can then lowered further by drying in an oven/dryer. The drying temperature is preferably in the range of 90° C. to 120° C., and the retention time in the dryer is preferably about 5 minutes to about 20 minutes.

The soft semi-moist pieces preferably have a density of about 330 g/L to about 430 g/L. The moisture content of the finished product is preferably about 10% to about 20% with a water activity preferably from about 0.64 to about 0.75.

Then the soft semi-moist food compositions can be mixed with a dry food composition to form a blended composition. For example, the soft semi-moist food compositions can be soft semi-most kibbles that are mixed with dry kibbles. In an embodiment, the ratio of the dry food composition to the soft semi-moist composition is from about 75:25 to about 90:10, for example about 80:20. Then the blended composition can be filled into a suitable container for storage. As a non-limiting example for illustrative purposes only, the soft semi-most kibbles that are mixed with the dry kibbles can have a water activity of about 0.1 higher than the water activity of the dry kibbles and thus provide a multi-texture organoleptic character to the blended composition.

In another aspect of the present disclosure, a method of providing nutrition to a pet is provided. The pet can be a companion animal. The method comprises administering any of the embodiments of the soft semi-moist food composition disclosed herein, alone or in a blended composition with dry kibbles. If the soft semi-moist food composition is administered to a dog, preferably the humectant is propylene glycol and glycerin; if the soft semi-moist food composition is administered to a cat, preferably the humectant is glycerin only.

EXAMPLES

The following non-limiting examples are illustrative of embodiments of the present disclosure.

Example 1

Standard dry pellets were manufactured in the classical way as well known by those skilled in the art, and the moisture content was adjusted around 9-10% in order to obtain a water activity around 0.5 to 0.6.

Soft kibbles were prepared separately as described below.

TABLE 1

| Powder Mixture for Control Soft Kibble | | |
|---|---|---|
| Ingredient | Quantity (kg) | % |
| Ground wheat | 192 | 64 |
| Meat and poultry meals | 87 | 29 |
| additive powders (mineral, vitamins, colorants, preservatives) | 21 | 7 |
| Total | 300 | 100 |

This powder mixture was extruded. The moisture of the extrudate was adjusted to around 20% by injecting water in the first barrel of the extruder. A mixture of mono propylene glycol and glycerin was also injected in the extruder in order to obtain a level of 9% of glycerine and 5% of mono propylene glycol in the finished product.

The final moisture after expansion at the outlet of the extruder and after cooling to room temperature (20° C.) was around 15-17% (Karl Fischer method).

TABLE 2

Powder Mixture for Modified Soft Kibble

| Ingredient | Quantity (kg) | % |
|---|---|---|
| Ground wheat | 192 | 64.0 |
| Meat and poultry meals | 85 | 28.3 |
| Mono glutamate de sodium | 2 | 0.7 |
| additive powders | 21 | 7.0 |
| Total | 300 | 100 |

In this mixture, the meat and poultry meal content was reduced and replaced by sodium mono glutamate in order to have 0.7% of mono sodium glutamate in the powder mixture. This powder mixture was extruded exactly as the control mixture. The mono glutamate content of the finished product was around 0.5%.

The control soft kibble and the modified soft kibble were then respectively mixed with standard dry kibbles in a ratio of 80 dry pellet/20 soft kibble in an hermetic bag of 800 g. The products were stored at room temperature and texture, and moisture and water activity were measured at periodical storage times. The trial was repeated twice. The results are shown in FIG. 1. Specifically, FIG. 1 shows the variation of product softness during storage in a blend with dry pellets (60 days).

The modified soft kibble which contained 0.5% of sodium glutamate (relative to finished product) remained softer during the storage while the product without glutamate became rapidly hard. The accepted threshold to consider a product hard is 25% of displacement at 68N. The standard product dropped under this threshold after only 15 days of storage while the modified recipe was still around 35% after 2 months of storage.

Example 2

In this example, the soft kibble recipes were simplified as compared to Example 1. The soft kibbles were prepared separately as described below.

TABLE 3

Powder Mixture for Control Soft Kibble

| Ingredient | Quantity (kg) | % |
|---|---|---|
| Ground wheat | 250 | 83.3 |
| additive powders | 50 | 16.7 |
| Total | 300 | 100 |

TABLE 4

Powder Mixture for Modified Soft Kibble

| Ingredient | Quantity (kg) | % |
|---|---|---|
| Ground wheat | 191 | 63.7 |
| Digest Powder (1 or 2) | 88 | 29.3 |
| additive powders | 21 | 7.0 |
| Total | 300 | 100 |

In this example, powder digest (digestion of animal liver with protease followed by spray drying) was added to the modified soft kibble in order to have around 30% of digest in the powder mixture, and the other powder percentages were reduced accordingly. Two different digest powders were used in this trial. Powder digest 1 had a lower content in free amino-acid (11%) than powder digest 2 (25%). The powder mixtures were extruded exactly as the mixtures in Example 1.

Figure 2:
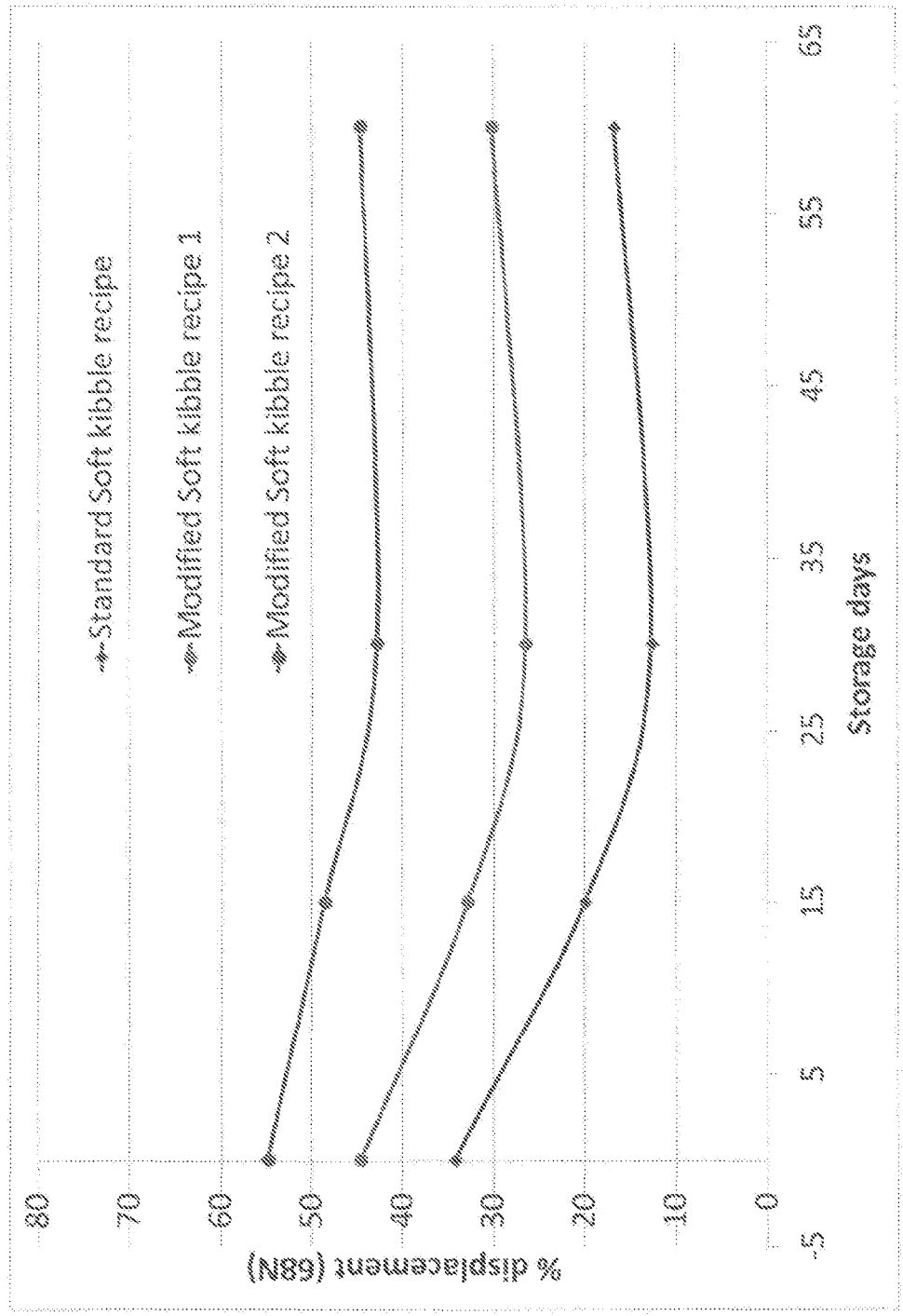
FIG. 2 is a graph showing product softness as a function of storage time in a blend with dry pellets for various soft semi-moist kibbles tested in the second experimental example in the present disclosure.

The texture stability results are presented in FIG. 2. Specifically, FIG. 2 shows variation of product softness during storage blended with dry pellets (60 days). The addition of the powder digest improved significantly the initial softness and more when free amino acid content was higher. This initial improvement was not lost during the storage in the dry pellet blend. After two months, the digest addition resulted in softness more than 3 times softer in the best case than the reference sample.

Figure 3:
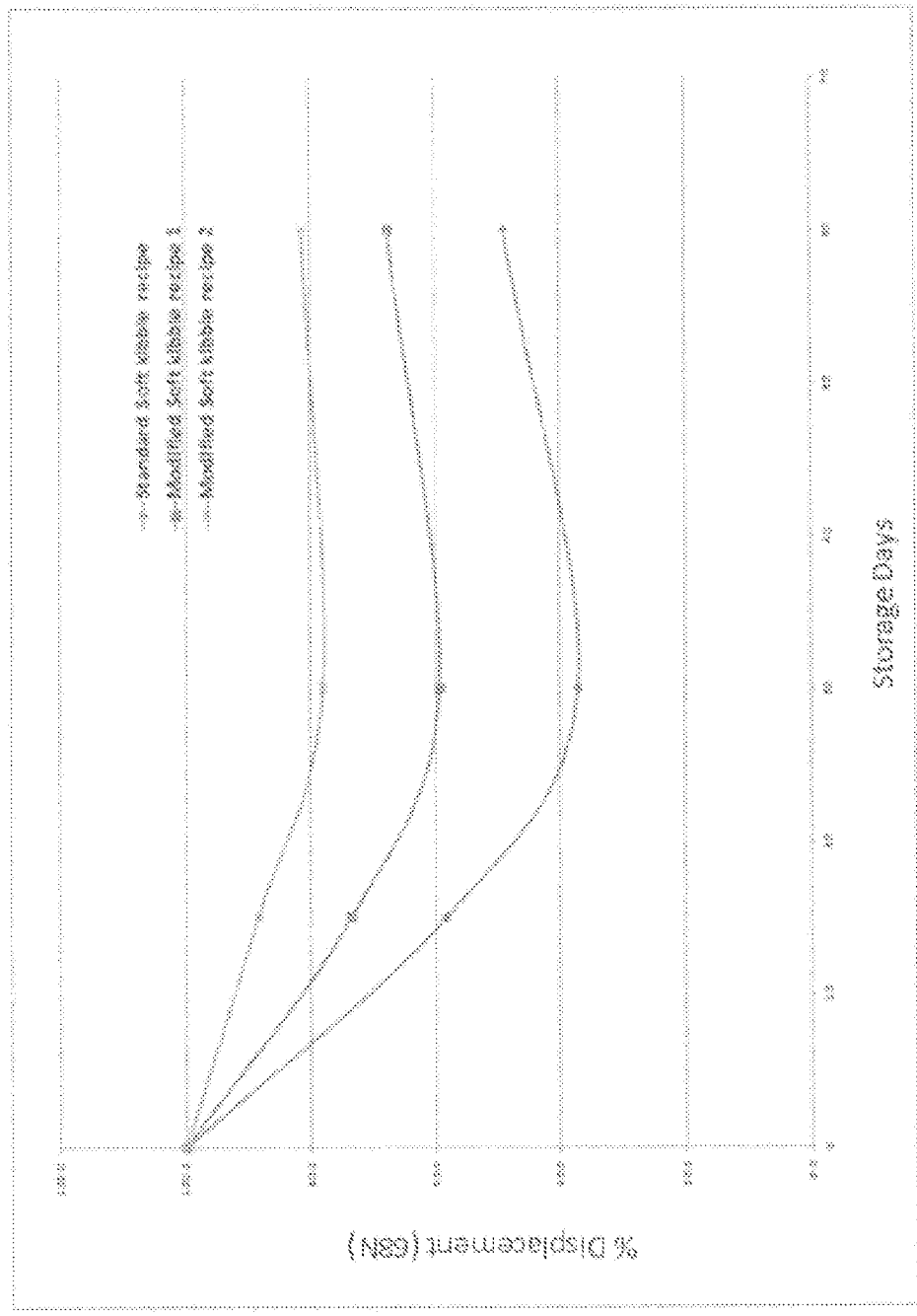
FIG. 3 is a graph showing the percentage of softness variation as compared to initial texture during storage blended with dry pellets for various soft semi-moist kibbles tested in the second experimental example in the present disclosure.

If results are expressed as the percentage of softness texture as compared to the initial texture, the texture of the samples containing digest powder were more stable over storage time than the reference sample as illustrated in FIG. 3. Specifically, FIG. 3 shows the percentage of softness variation as compared to initial texture during storage blended with dry pellets (60 days).

Example 3

Similar trials were done with soft kibble compositions using wheat flour instead of ground whole wheat grains, and the results were confirmed in this variation as detailed below.

TABLE 5

Powder Mixture for Control Soft Kibble

| Ingredient | Quantity (kg) | % |
|---|---|---|
| wheat flour | 246 | 82 |
| additive powders (mineral, vitamins, colorants, preservatives) | 54 | 18 |
| Total | 300 | 100 |

Ground whole wheat was replaced by typical bakery wheat flour.

TABLE 6

Powder Mixture for Modified Soft Kibble 1

| Ingredient | Quantity (kg) | % |
|---|---|---|
| wheat flour | 186 | 62 |
| Digest powder | 60 | 20 |
| additive powders (mineral, vitamins, colorants, preservatives) | 54 | 18 |
| Total | 300 | 100 |

As in the Example 2, a part of the starch (here wheat flour) is replaced by animal liver digest. In this example, about 6% of glycerine is used as water activity depressor.

TABLE 7

Powder Mixture for Modified Soft Kibbles 2 and 3

| Ingredient | Quantity (kg) | % |
|---|---|---|
| Corn starch | 155 | 52 |
| Corn gluten meal | 35 | 12 |
| Digest powder | 60 | 20 |
| additive powders (mineral, vitamins, colorants, preservatives) | 50 | 17 |
| Total | 300 | 100 |

In the mixtures for modified soft kibbles 2 and 3, ground wheat was replaced with corn starch and corn gluten meal, and around 20% of animal liver digest was added to the powder mixture. In modified recipe 2, mono propylene glycol was injected in the process; in modified recipe 3, glycerine was injected in the process. In both cases, the humectant level was around 6% in the finished product.

Figure 4:
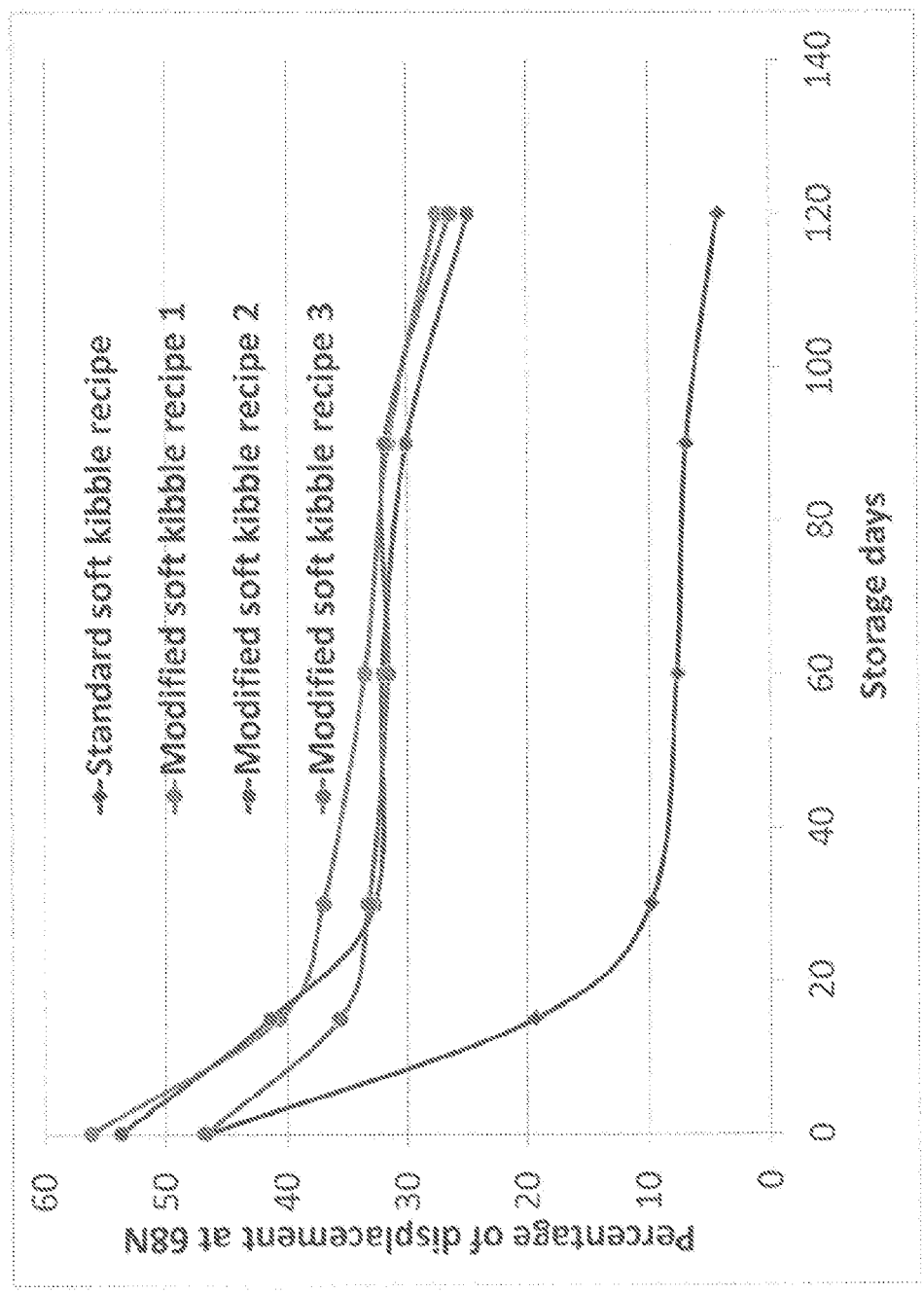
FIG. 4 is a graph showing product softness as a function of storage time in a blend with dry pellets for various soft semi-moist kibbles tested in the third experimental example in the present disclosure.
Figure 5:
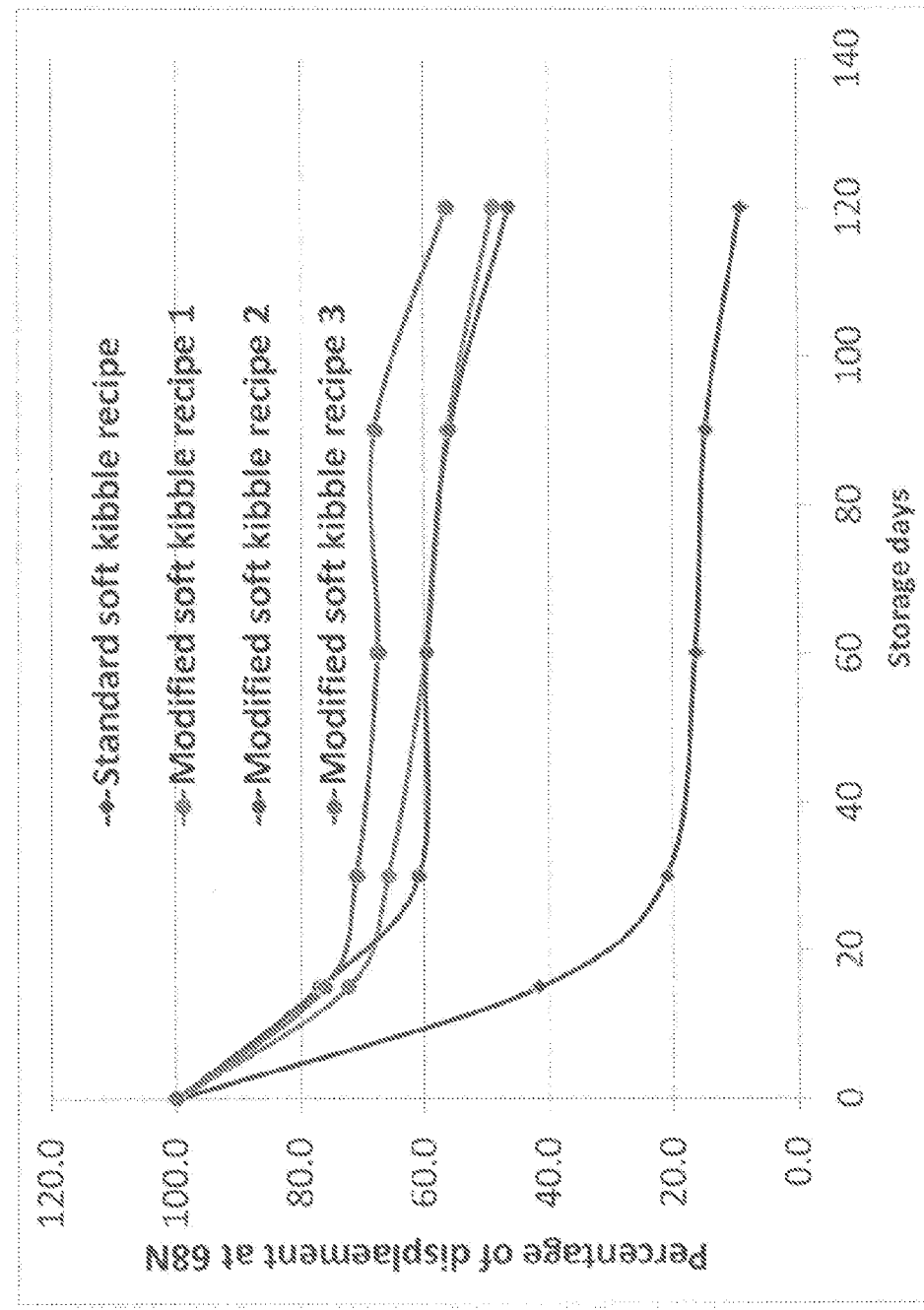
FIG. 5 is a graph showing the percentage of softness variation as compared to initial texture during storage blended with dry pellets for various soft semi-moist kibbles tested in the third experimental example in the present disclosure.

FIG. 4 shows the kibble softness variation as compared to initial texture during storage blended with dry pellets (120 days). These results confirmed the soft texture stabilization during storage when a mixture of free amino acids is added to the product. If the results are expressed as the percentage of softness texture as compared to the initial texture, the texture of the samples containing digest powder lost around 50% of their initial soft texture while the samples without added free amino acids lost more than 90% of their initial texture, as illustrated in FIG. 5. Specifically, FIG. 5 shows the percentage of softness variation as compared to initial texture during storage blended with dry pellets (120 days).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of producing a blended food composition comprising a soft semi-moist pet kibble and dry kibbles, the method comprising:
   forming a mixture having a pH from about 4.0 to about 8.0 and comprising water, meat meal, at least 35 wt. % starch source, about 0.5 wt. % to about 20 wt. % free form glutamate, and about 5 wt. % to about 20 wt. % humectant;
   extruding the mixture to form an expanded extrudate;
   cooling the expanded extrudate to have a moisture content of about 10 wt. % to about 20 wt. % to form the soft semi-moist pet kibble; and
   mixing the soft semi-moist pet kibble and the dry kibbles to form the blended food composition,
   wherein the soft semi-moist kibble remains soft within the blended food composition, and the soft semi-moist kibble maintains at least 50% of initial softness through storage for 3-6 months with the dry kibbles in the blended food composition, which comprises up to 90 wt. % of the dry kibbles.

2. The method of claim 1, wherein the starch source comprises wheat.

3. The method of claim 1, wherein the meat meal is in the mixture in an amount less than the starch source.

4. The method of claim 1, wherein the mixture further comprises a vitamin, a mineral, a preservative and a colorant.

5. The method of claim 1, wherein the humectant comprises glycerine and propylene glycol.

6. The method of claim 1, wherein the moisture content of the soft semi-moist pet kibble is about 15 wt. % to about 17 wt. %.

7. The method of claim 1, wherein at least a portion of the mixture is formed in the extruder by introducing the starch source, the meat meal and the free form glutamic acid into the extruder as a dry base and adding the humectant and the water to the dry base in the extruder.

8. A method of producing a blended food composition comprising a soft semi-moist pet kibble and dry kibbles, the method comprising:
   forming a mixture having a pH from about 4.0 to about 8.0 and comprising water, at least 35 wt. % starch source, about 5 wt. % to about 20 wt. % humectant, and at least 20 wt. % animal digest, wherein free form amino acids are at least 20 wt. % of the animal digest;
   extruding the mixture to form an expanded extrudate;
   cooling the expanded extrudate to have a moisture content of about 10 wt. % to about 20 wt. % to form the soft semi-moist pet kibble; and
   mixing the soft semi-moist pet kibble and the dry kibbles to form the blended food composition,
   wherein the animal digest improves initial softness, the soft semi-moist kibble remains soft within the blended food composition, and the soft semi-moist kibble maintains at least 50% of initial softness through storage for 3-6 months with the dry kibbles in the blended food composition, which comprises up to 90 wt. % of the dry kibbles.

9. The method of claim 8, wherein the starch source comprises wheat.

10. The method of claim 8, wherein the mixture further comprises a vitamin, a mineral, a preservative and a colorant.

11. The method of claim 8, wherein the humectant comprises glycerine and propylene glycol.

12. The method of claim 8, wherein the moisture content of the soft semi-moist pet kibble is about 15 wt. % to about 17 wt. %.

13. The method of claim 8, wherein at least a portion of the mixture is formed in the extruder by introducing the starch source and the animal digest into the extruder as a dry base and adding the humectant and the water to the dry base in the extruder.

* * * * *